(12) United States Patent
Gao

(10) Patent No.: US 11,804,609 B2
(45) Date of Patent: Oct. 31, 2023

(54) FUEL-CELL HYDROGEN RECYCLING MEANS

(71) Applicant: Shanghai Everpower Technologies Ltd., Shanghai (CN)

(72) Inventor: Yong Gao, Shanghai (CN)

(73) Assignee: Shanghai Everpower Technologies Ltd., Shanghai (CN)

( * ) Notice: Subject to any disclaimer, the term of this patent is extended or adjusted under 35 U.S.C. 154(b) by 29 days.

(21) Appl. No.: 17/040,241

(22) PCT Filed: Mar. 13, 2019

(86) PCT No.: PCT/CN2019/077907
§ 371 (c)(1),
(2) Date: Sep. 22, 2020

(87) PCT Pub. No.: WO2020/073599
PCT Pub. Date: Apr. 16, 2020

(65) Prior Publication Data
US 2021/0367248 A1    Nov. 25, 2021

(30) Foreign Application Priority Data

Oct. 12, 2018  (CN) .......................... 201811190724.1

(51) Int. Cl.
*H01M 8/04119* (2016.01)
*H01M 8/04082* (2016.01)
(Continued)

(52) U.S. Cl.
CPC ... *H01M 8/04164* (2013.01); *H01M 8/04179* (2013.01); *H01M 8/04201* (2013.01);
(Continued)

(58) Field of Classification Search
CPC ......... H01M 8/04164; H01M 8/04179; H01M 8/04201; H01M 8/04223; H01M 8/04716;
(Continued)

(56) References Cited

U.S. PATENT DOCUMENTS

2013/0089797 A1*  4/2013  Falta ................. H01M 8/04231
                                                        429/414

FOREIGN PATENT DOCUMENTS

CN         103035935 A       4/2013
CN         204793044      *  11/2015
(Continued)

OTHER PUBLICATIONS

International Search Report; PCT/CN2019/077907 dated Jul. 1, 2019.

*Primary Examiner* — Matthew W Van Oudenaren

(57) ABSTRACT

A fuel-cell hydrogen recycling system, comprising a fuel cell; a controller; a hydrogen recycling pipeline provided with a hydrogen circulating pump and a check valve; an air inlet pipeline and an air outlet pipeline connected to the fuel cell, respectively; a hydrogen inlet pipeline provided with a hydrogen inlet valve; and a hydrogen outlet pipeline provided with a hydrogen outlet valve, with the hydrogen recycling pipeline connected to the hydrogen inlet pipeline, wherein the system further comprises a gas-liquid separating reservoir, which comprises a reservoir positioned at its upper portion and a gas-liquid separator positioned at its lower portion communicated with each other vertically, the reservoir is connected to the hydrogen outlet pipeline and the hydrogen recycling pipeline, respectively, and the gas-liquid separator discharges exhaust water and redundant nitrogen through a exhaust pipeline that is provided with a ventilation valve.

5 Claims, 1 Drawing Sheet

(51) Int. Cl.
  *H01M 8/04223* (2016.01)
  *H01M 8/04701* (2016.01)
  *H01M 8/04746* (2016.01)
  *H01M 8/04089* (2016.01)
  *H01M 8/043* (2016.01)
  *H01M 8/0438* (2016.01)

(52) U.S. Cl.
  CPC ... *H01M 8/04223* (2013.01); *H01M 8/04716* (2013.01); *H01M 8/04753* (2013.01); *H01M 8/043* (2016.02); *H01M 8/04097* (2013.01); *H01M 8/04402* (2013.01); *H01M 8/04761* (2013.01)

(58) Field of Classification Search
  CPC ......... H01M 8/04753; H01M 8/04231; H01M 8/04291; H01M 8/04462; H01M 8/04097; H01M 8/0438; H01M 8/0444; H01M 8/04156; H01M 8/04171; H01M 8/04225; H01M 8/04228; H01M 8/04302; H01M 8/04303; H01M 8/043; H01M 8/04388; H01M 8/04402; H01M 8/04425; H01M 8/04447; H01M 8/04761; H01M 8/04776; H01M 8/04798; H01M 8/04805; H01M 8/04955
  See application file for complete search history.

(56) References Cited

FOREIGN PATENT DOCUMENTS

| | | |
|---|---|---|
| CN | 204793044 U | 11/2015 |
| CN | 205376647 U | 7/2016 |
| CN | 205900704 U | 1/2017 |
| CN | 109411783 A | 3/2019 |
| JP | 2002231294 A | 8/2002 |

\* cited by examiner

FUEL-CELL HYDROGEN RECYCLING MEANS

BACKGROUND OF THE INVENTION

1. Technical Field

The present invention relates to control of fuel cell systems, and more particularly to a fuel-cell hydrogen recycling means.

2. Description of Related Art

As a novel, environmentally friendly power-generating product, a fuel cell is advantageous for being noise-free, pollution-free, compact in size, easy to maintain and economic while having long service life and a high energy conversion rate.

A hydrogen fuel cell is a means capable of converting hydrogen and oxidant into electric energy and reaction products. In a proton exchange membrane fuel cell that uses hydrogen as its fuel and uses oxygen-containing air (or pure oxygen) as its oxidant, the fuel, i.e. hydrogen, after catalytic electrochemical reaction in the anode zone, produces positive hydrogen ions (or protons). The proton exchange membrane helps to move positive hydrogen ions from the anode zone to the cathode zone. In addition, the proton exchange membrane separates the hydrogen-containing fuel flow from the oxygen-containing air flow to prevent mixing and explosive reaction.

Hydrogen fuel cells typically produce water when operating and supplying power. For ensuring normal operation and constant performance of a fuel cell, water produced inside the fuel cell and redundant nitrogen have to be discharged. To be specific, operation of a fuel cell requires a stoichiometric ratio between the fuel (i.e. hydrogen) and the oxidant (i.e. air) greater than 1. The excessive hydrogen and excessive air portion carries water produced inside the fuel cell and then directly discharge water outside the cell.

A current feasible approach is to discharge the water generated inside the fuel cell together with excessive air as a carrier directly outside the fuel cell. Nevertheless, it is improper to use excessive hydrogen to carry water from the anode zone of the fuel cell and discharge the both outside the fuel cell because this not only causes exhaust of the hydrogen as the fuel, but also brings about safety concerns when the exhaust gas containing excessive hydrogen is discharged directly.

China Patent No. CN204793044U discloses a fuel-cell hydrogen recycling system. The known system comprises a fuel cell, a hydrogen inlet valve, a hydrogen outlet valve, a hydrogen circulating pump, a check valve, a container, an air compressor, a water-draining solenoid valve, a hydrogen inlet pipeline, a hydrogen outlet pipeline, an air inlet pipeline and an air outlet pipeline. The hydrogen inlet valve is installed on the hydrogen inlet pipeline, and the hydrogen outlet valve is installed on the hydrogen outlet pipeline. The exit of the hydrogen outlet valve is connected to both the inlet of the hydrogen circulating pump and the upper entrance of the container. The outlet of the hydrogen circulating pump is connected to an entrance of the check valve, and the outlet of the check valve is connected to the hydrogen inlet pipeline between the hydrogen inlet valve and the fuel cell. The air compressor is installed on the air inlet pipeline of the fuel cell. The water-draining solenoid valve is installed on the water-draining pipeline of the container. However, in one control cycle, every time the hydrogen outlet valve opens, the circulating pump and the check valve have to open, and the frequent operation can shorten the service life of the solenoid valve and increase the risk of leakage in case of multiple operations. Besides, the exhaust gas so discharged is not homogeneous and thus less safe.

SUMMARY OF THE INVENTION

For overcoming the shortcomings of the prior art, the objective of the present invention is to provide a fuel-cell hydrogen recycling means.

The objective of the present invention may be achieved through the following technical schemes.

A fuel-cell hydrogen recycling means comprises a fuel cell; a controller; a hydrogen recycling pipeline provided with a hydrogen circulating pump and a check valve; an air inlet pipeline and an air outlet pipeline connected to the fuel cell, respectively; a hydrogen inlet pipeline provided with a hydrogen inlet valve; and a hydrogen outlet pipeline provided with a hydrogen outlet valve. The hydrogen recycling pipeline is connected to the hydrogen inlet pipeline. The means further comprises an integrated gas-liquid separating reservoir. The gas-liquid separating reservoir has a reservoir positioned high and a gas-liquid separator positioned low communicated with each other vertically. The reservoir is connected to the hydrogen outlet pipeline and the hydrogen recycling pipeline, respectively. The gas-liquid separator discharges exhaust water and redundant nitrogen through an exhaust pipeline that is provided with a ventilation valve.

A pressure sensor, which is connected to the controller, is located between the hydrogen outlet valve and an inlet of the reservoir.

Inside the reservoir, there is a nitrogen concentration meter connected to the controller.

Inside the gas-liquid separator, there is a level gauge connected to the controller.

The exhaust pipeline converges to the air outlet pipeline, and the compound pipeline after converging is provided with a gas mixer for evenly mixing the hydrogen intermittently discharged by the exhaust pipeline and air so as to reduce the concentration of hydrogen.

A plurality of cooling fins are arranged along the hydrogen outlet pipeline, in the section from the hydrogen outlet valve to the inlet of the reservoir, on the outer wall of the gas-liquid separating reservoir or on the inner wall of the reservoir.

The reservoir has a volume sized according to practical needs and ranging between 0.5 and 20 L.

A method for controlling the means comprises:
1) opening the hydrogen inlet valve and keeping the hydrogen inlet pipeline unobstructed, while keeping the hydrogen outlet solenoid valve, the check valve, the hydrogen circulating pump and the ventilation valve closed, and the fuel cell stack starting reaction;
2) during a venting cycle of the electrochemical reaction of the stack, opening the hydrogen outlet valve to enter the means into its venting state, and after exhaust gas containing water, nitrogen and hydrogen enters the reservoir and when the pressure of the exhaust gas as detected by the pressure sensor is higher than a preset pressure upper limit, opening both the hydrogen circulating pump and the check valve to draw the hydrogen in the reservoir back to the hydrogen inlet pipeline;
3) when the concentration of nitrogen in the reservoir as measured by the nitrogen concentration meter is higher than a preset nitrogen concentration threshold or when a water level as measured by the level gauge is higher than a present water level threshold, opening the ventilation valve to discharge the separated liquid water and redundant nitrogen and closing the ventilation valve upon clearance; and 4) when the pressure of exhaust gas as detected by the pressure sensor is lower than a preset pressure lower limit, closing the hydrogen circulating pump and the check valve, and starting control of the next venting cycle of the electrochemical reaction of the stack.

In Step 2), two adjacent said venting states are separated by one said venting cycle of the electrochemical reaction of the stack, and in the same venting cycle of the electrochemical reaction of the stack, the hydrogen outlet valve opens for one or more times with a constant interval therebetween, while the hydrogen circulating pump and the check valve open for only one time.

In the same venting cycle of the electrochemical reaction of the stack, the opening frequency of the hydrogen outlet valve is 1-10 times of the opening frequency of the hydrogen circulating pump.

As compared to the prior art, the present invention has the following features:

Buffering exhaust gas: The present disclosure adapts the conventional gas-liquid separator that is not capable of buffering the stored exhaust gas to an integrated gas-liquid separating reservoir, the reservoir could realize buffing, storing and gauging functions, and since the gas-liquid separator is installed in the lower part of the reservoir, nitrogen and liquid water that have relatively high specific gravities can be discharged smoothly and effectively.

2. Effective heat dissipation: In the present disclosure, a plurality of cooling fins are arranged along the hydrogen outlet pipeline, in the section from the hydrogen outlet valve to the inlet of the reservoir, on the outer wall of the gas-liquid separating reservoir or on the inner wall of the reservoir to effectively cool the high-temperature exhaust gas (up to 70-80° C.) to the ambient temperature, thereby improving the efficiency of gas-liquid separation and ensuring safe use of the reservoir.

3. Even and safe venting: In the present disclosure, the exhaust pipeline converges to the air outlet pipeline, and the compound pipeline after converging is provided with the gas mixer for evenly mixing and producing turbulent flow. The exhaust gas so discharged uses the mass air produced during the reaction of the cell stack as impetus and the gas mixer produces turbulence in hydrogen in the exhaust gas and air and evenly mixes them, so that the exhaust gas eventually discharged has the concentration of hydrogen below 2% and homogenous, thereby ensuring safe discharging of exhaust gas.

4. Independent liquid water discharge and hydrogen recycling: In the present disclosure, control of discharging of liquid water and recycling of hydrogen are conducted under determinations based on respective logics that are independent of each other. Pressure threshold ranges are used to control the periodical opening and closing of the hydrogen outlet valve and the circulating pump, and the opening and closing of the ventilation valve is determined by the concentration of nitrogen or the level of liquid water, which is easy to realize in terms of control.

DETAILED DESCRIPTION OF THE INVENTION

The invention as well as a preferred mode of use, further objectives and advantages thereof will be best understood by reference to the following detailed description of illustrative embodiments when read in conjunction with the accompanying drawings.

Embodiment

Figure 1:
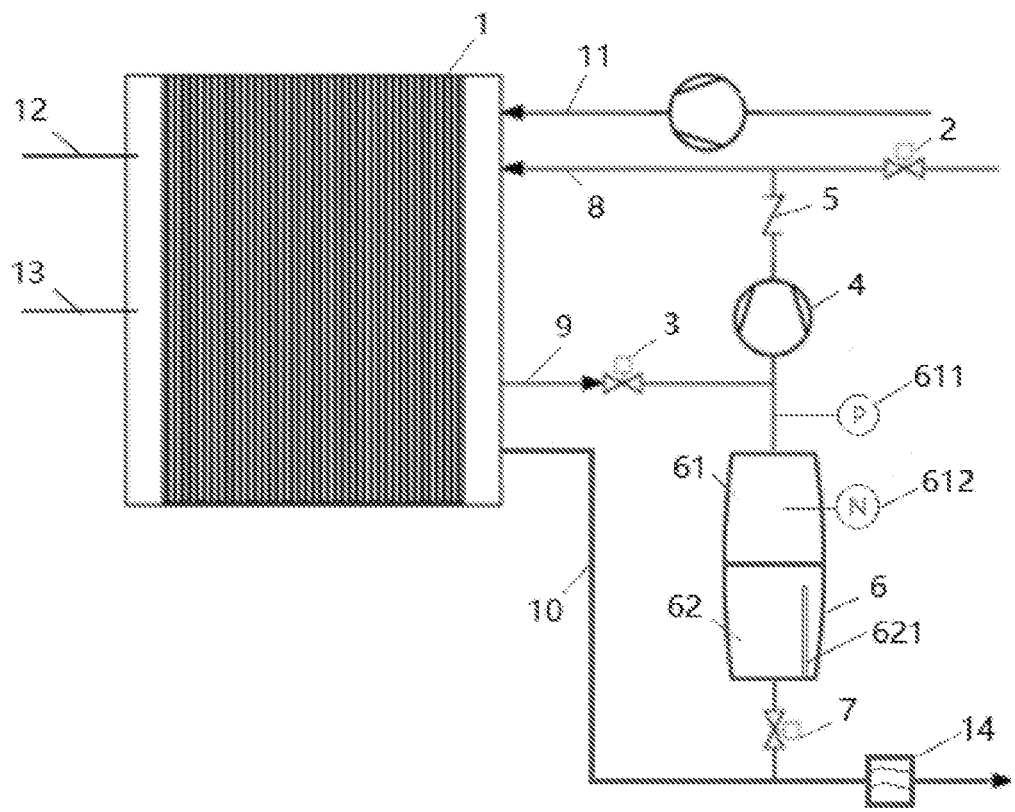
FIG. 1 is a schematic structural drawing of a means of the present invention.

As shown in FIG. 1, the present invention provides a fuel-cell hydrogen recycling means, which comprises a fuel cell 1; a controller; a hydrogen recycling pipeline provided with a hydrogen circulating pump 4 and a check valve 5; an air inlet pipeline 11 and an air outlet pipeline 10 connected to the fuel cell 1, respectively; a hydrogen inlet pipeline 8 provided with a hydrogen inlet valve 2; and a hydrogen outlet pipeline 9 provided with a hydrogen outlet valve 3. The hydrogen recycling pipeline is connected to the hydrogen inlet pipeline 8. The means further comprises an integrated gas-liquid separating reservoir 6. The gas-liquid separating reservoir 6 comprises a reservoir 61 arranged at an upper portion and a gas-liquid separator 62 arranged at a lower portion, which are integrated as a unity or separated but communicated with each other through mesh. The reservoir 61 is connected to the hydrogen outlet pipeline 9 and the hydrogen recycling pipeline, respectively. The gas-liquid separator 62 discharges exhaust water and redundant nitrogen through an exhaust pipeline that is provided with a ventilation valve 7. The controller is connected to the hydrogen circulating pump 4, the check valve 5, the ventilation valve 7, the hydrogen outlet valve 3, and the hydrogen inlet valve 2, respectively. The reservoir 61 has a pressure sensor 611, which is connected to the controller, arranged at its joint with the hydrogen exhaust pipeline 9.

Inside the reservoir 61 there is a nitrogen concentration meter 612 connected to the controller for detecting the concentration of nitrogen.

Inside the gas-liquid separator 62 there is a level gauge 621 connected to the controller for detecting the level of liquid water.

The exhaust pipeline converges to the air exhaust pipeline 10, and the compound pipeline after converging is provided with a gas mixer 14 for even mixing and turbulence forming. The gas mixer 14 serves to evenly mix the hydrogen intermittently discharged by the exhaust pipeline and air so as to reduce the concentration of hydrogen.

A plurality of cooling fins are arranged along the hydrogen exhaust pipeline 9, in the section from the hydrogen outlet valve 3 to the inlet of the reservoir 61, on the outer wall of the gas-liquid separating reservoir 6 or on the inner wall of the reservoir 61.

In the present embodiment, the reservoir 61 has a volume sized according to practical needs and the range may be chosen from 0.5-20 L in order to ensure storage of exhaust gas from several rounds of discharge.

Figure 2:
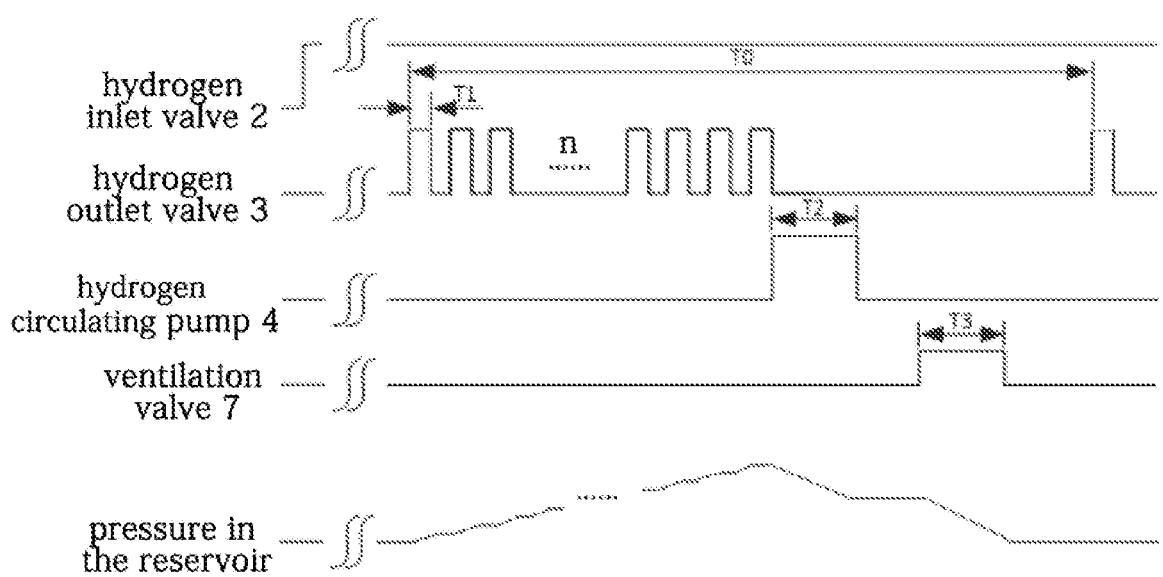
FIG. 2 is a control sequence diagram of the present invention.

As shown in FIG. 2, the disclosed means is controlled as below:

1) opening the hydrogen inlet valve 2 and keeping the hydrogen inlet pipeline 8 unobstructed, while keeping the hydrogen outlet valve 3, the check valve 5, the hydrogen circulating pump 4 and the ventilation valve 7 closed, so that stacks of the fuel cell 1 start to react;

2) during a venting cycle T0 of the electrochemical reaction of the stack, opening the hydrogen outlet valve 3 to enter the means into its venting state, (between adjacent said venting states is one said venting cycle of the electrochemical reaction of the stack, and in the same venting cycle of the electrochemical reaction of the stack, the hydrogen outlet valve 3 opens for one or more times with a constant interval therebetween (i.e., a round of the venting state), while the hydrogen circulating pump 4 and the check valve 5 open for only one time (for a duration T2). According to the present embodiment, in the same venting cycle of the electrochemical reaction of the stack, the hydrogen outlet valve 3 has an opening frequency equal to 1-10 times of the opening frequency of the hydrogen circulating pump 4). After exhaust gas containing water, nitrogen and hydrogen enters the reservoir 61 and when the pressure of the exhaust gas as detected by the pressure sensor 611 is higher than a preset pressure upper limit, opening both the hydrogen circulating pump 4 and the check valve 5 simultaneously to draw the hydrogen in the reservoir 61 back to the hydrogen inlet pipeline 8;

3) when the concentration of nitrogen in the reservoir as measured by the nitrogen concentration meter 612 is higher than a preset nitrogen concentration threshold or when a water level as measured by the level gauge 621 is higher than a present water level threshold, opening the ventilation valve 7 to discharge the separated liquid water and redundant nitrogen and closing the ventilation valve 7 upon clearance (for a duration T3); and 4) when the pressure of exhaust gas as detected by the pressure sensor 611 is lower than a preset pressure lower limit, closing the hydrogen circulating pump 4 and the check valve 5, and starting control of the next venting cycle of the electrochemical reaction of the stack.

The present invention uses repeated, short, equal-duration opening of the hydrogen outlet valve 3 to evenly discharge the exhaust gas as the product of the reaction of the stack to the reservoir 61, where the exhaust gas is collected, buffered and stored. In this way, the check valve 5 and the hydrogen circulating pump 4 do not have to open and close along with the hydrogen outlet valve 3 every time, thereby increasing the service life and facilitating central detection and control. In the present embodiment, the opening duration T1 of the hydrogen outlet valve 3 is typically but not limited to 0.1-0.15 sec., and the opening frequency is typically but not limited to 1-10 times.

What is claimed is:

1. A fuel cell hydrogen recycling system, comprising a fuel cell, a controller, and a gas-liquid separating reservoir comprising a storage tank and a gas-liquid separator positioned beneath the storage tank, the storage tank and the gas-liquid separator are connected to each other vertically, wherein the storage tank is connected to a hydrogen exhaust pipeline and a hydrogen recycling pipeline respectively, the hydrogen exhaust pipeline is provided with a hydrogen outlet valve operated by the controller, the hydrogen recycling pipeline is provided with a hydrogen circulating pump and a check valve, both of which are operated by the controller, a period between adjacent venting states is defined as a venting cycle of electrochemical reaction of a stack, during the venting cycle of electrochemical reaction of a stack, the hydrogen outlet valve is opened by the controller more than once with a constant interval therebetween, and the hydrogen circulating pump and the check valve open only once.

2. The fuel cell hydrogen recycling system of claim 1, wherein during the venting cycle of electrochemical reaction of a stack, an opening frequency of the hydrogen outlet valve is 2-10 times that of an opening frequency of the hydrogen circulating pump.

3. The fuel cell hydrogen recycling system of claim 1, wherein a pressure sensor connected to the controller is provided between the hydrogen outlet valve and an inlet of the storage tank, during the venting cycle of electrochemical reaction of a stack, the hydrogen outlet valve is opened by the controller to enter the fuel cell hydrogen recycling system into the venting state, and after exhaust gas containing water, nitrogen and hydrogen enters the storage tank and when a pressure of the exhaust gas as detected by the pressure sensor is higher than a preset pressure upper limit, the hydrogen circulating pump and the check valve are opened by the controller to draw the hydrogen in the storage tank back to a hydrogen inlet pipeline.

4. The fuel cell hydrogen recycling system of claim 2, wherein the gas-liquid separator discharges water and nitrogen through an exhaust pipeline that is provided with a ventilation valve operated by the controller, inside the storage tank there is a nitrogen concentration meter connected to the controller, inside the gas-liquid separator there is a level gauge connected to the controller, the gas-liquid separator is connected to the ventilation valve, when a concentration of nitrogen in the storage tank as measured by the nitrogen concentration meter is higher than a preset nitrogen concentration threshold or when a water level as measured by the level gauge is higher than a preset water level threshold, the controller opens the ventilation valve to discharge the water and the nitrogen and closes the ventilation valve after the water and the nitrogen have been discharged.

5. The fuel cell hydrogen recycling system of claim 4, wherein the gas-liquid separator is provided beneath the storage tank in the gas-liquid separating reservoir, for discharge of the nitrogen and the water that have specific gravities larger than hydrogen through the ventilation valve.

* * * * *